United States Patent
Kubiak et al.

(10) Patent No.: US 12,258,446 B2
(45) Date of Patent: Mar. 25, 2025

(54) POLYKETONE POWDER FOR LASER SINTERING

(71) Applicant: LUMAS Polymers LLC, Chaska, MN (US)

(72) Inventors: Steven Kubiak, Edina, MN (US); Zachary Peterson, New Hope, MN (US); Nicholas John Dippel, Burnsville, MN (US); Mathew Artin Torosian, Highlands Ranch, CO (US); Thomas Fry, Victoria, MN (US)

(73) Assignee: LUMAS Polymers LLC, Chaska, MN (US)

( * ) Notice: Subject to any disclaimer, the term of this patent is extended or adjusted under 35 U.S.C. 154(b) by 0 days.

(21) Appl. No.: 18/289,857

(22) PCT Filed: May 16, 2022

(86) PCT No.: PCT/US2022/029422
§ 371 (c)(1),
(2) Date: Nov. 7, 2023

(87) PCT Pub. No.: WO2022/245721
PCT Pub. Date: Nov. 24, 2022

(65) Prior Publication Data
US 2024/0247103 A1 Jul. 25, 2024

Related U.S. Application Data

(60) Provisional application No. 63/217,451, filed on Jul. 1, 2021, provisional application No. 63/189,609, filed on May 17, 2021.

(51) Int. Cl.
| | |
|---|---|
| C08G 67/02 | (2006.01) |
| B29B 9/02 | (2006.01) |
| B29B 13/02 | (2006.01) |
| B29C 64/153 | (2017.01) |
| B29C 64/314 | (2017.01) |
| B33Y 40/10 | (2020.01) |
| B33Y 70/00 | (2020.01) |
| C08J 3/12 | (2006.01) |
| C08J 3/14 | (2006.01) |
| C08J 9/00 | (2006.01) |
| C08J 9/36 | (2006.01) |
| C08L 73/00 | (2006.01) |
| C09D 5/03 | (2006.01) |
| C09D 173/00 | (2006.01) |
| B29K 61/00 | (2006.01) |
| B29K 71/00 | (2006.01) |

(52) U.S. Cl.
CPC .............. *C08G 67/02* (2013.01); *B29B 9/02* (2013.01); *B29B 13/021* (2013.01); *B29C 64/314* (2017.08); *B33Y 40/10* (2020.01); *B33Y 70/00* (2014.12); *C08J 3/12* (2013.01); *C08J 3/14* (2013.01); *C08J 9/0004* (2013.01); *C08J 9/36* (2013.01); *C08L 73/00* (2013.01); *C09D 5/031* (2013.01); *C09D 173/00* (2013.01); *B29C 64/153* (2017.08); *B29K 2061/00* (2013.01); *B29K 2071/00* (2013.01); *B29K 2995/004* (2013.01); *C08G 2140/00* (2013.01); *C08G 2150/20* (2013.01); *C08J 2201/054* (2013.01); *C08J 2361/02* (2013.01); *C08J 2373/00* (2013.01); *C08L 2205/025* (2013.01)

(58) Field of Classification Search
None
See application file for complete search history.

(56) References Cited

U.S. PATENT DOCUMENTS

| | | |
|---|---|---|
| 3,065,205 A | 11/1962 | Bonner, Jr. |
| 3,179,631 A | 4/1965 | Endry |
| 3,214,407 A | 10/1965 | Butterworth |
| 3,249,588 A | 5/1966 | Gall |
| 3,441,538 A | 4/1969 | Marks |
| 3,442,857 A | 5/1969 | Thornton |
| 3,516,966 A | 6/1970 | Berr |
| 4,704,448 A | 11/1987 | Brugel |
| 4,755,555 A | 7/1988 | Manwiller et al. |
| 4,816,556 A | 3/1989 | Gay et al. |
| 4,824,720 A | 4/1989 | Malone |

(Continued)

FOREIGN PATENT DOCUMENTS

| | | | |
|---|---|---|---|
| CN | 110655666 A | | 1/2020 |
| EP | 121965 | * | 11/1984 |

(Continued)

OTHER PUBLICATIONS

ISM; Mesh and Micron Sizes (2020) pp. 1-7 (Year: 2020).*
Bhamidipati, M., MS et al., "The Future of Carbon Dioxide for Polymer Processing in Tissue Engineering." Tissue Engineering: Part B, vol. 19, No. 3, 2013. DOI: 10.1089/ten.teb.2012.0361. (12 pages).

(Continued)

*Primary Examiner* — David J Buttner
(74) *Attorney, Agent, or Firm* — Young Basile Hanlon & MacFarlane, P.C.

(57) ABSTRACT

In one instance a semicrystalline polyketone powder useful for additive manufacturing is comprised of a bimodal melt peak determined by an initial differential scanning calorimetry (DSC) scan at 20° C./min and a $D_{90}$ particle size of at most 300 micrometers and average particle size of 1 micrometer to 150 micrometers equivalent spherical diameter. In another instance, A composition is comprised of a semicrystalline polyketone powder having a melt peak and a recrystallization peak, wherein the melt peak and recrystallization peak fail to overlap.

17 Claims, 11 Drawing Sheets

(56) References Cited

U.S. PATENT DOCUMENTS

| | | | |
|---|---|---|---|
| 4,835,250 A * | 5/1989 | Drent | C08G 67/02 528/392 |
| 4,853,462 A | 8/1989 | Hostetler et al. | |
| 4,894,435 A | 1/1990 | Drent | |
| 4,895,689 A * | 1/1990 | Gerlowski | C08J 5/18 264/237 |
| 4,985,278 A * | 1/1991 | George | B05D 1/10 427/407.1 |
| 5,138,032 A * | 8/1992 | Mastenbroek | C08G 67/02 528/392 |
| 5,391,640 A | 2/1995 | Akkapeddi et al. | |
| 5,395,055 A | 3/1995 | Shutov et al. | |
| 5,527,877 A | 6/1996 | Dickens, Jr. et al. | |
| 5,597,589 A | 1/1997 | Deckard | |
| 5,670,102 A | 9/1997 | Perman et al. | |
| 5,952,066 A | 9/1999 | Schmidt et al. | |
| 5,977,231 A | 11/1999 | Ash | |
| 6,136,948 A | 10/2000 | Dickens, Jr. et al. | |
| 6,177,518 B1 | 1/2001 | Lahijani | |
| 6,213,540 B1 | 4/2001 | Tusim et al. | |
| 6,284,810 B1 | 9/2001 | Burnham et al. | |
| 7,267,534 B2 | 9/2007 | Xu | |
| 10,364,349 B1 | 7/2019 | Bertelo et al. | |
| 10,479,733 B2 | 11/2019 | Diekmann et al. | |
| 11,851,526 B2 | 12/2023 | Louis et al. | |
| 2003/0181538 A1 | 9/2003 | Martel et al. | |
| 2005/0276967 A1 | 12/2005 | Prasad | |
| 2008/0058494 A1 | 3/2008 | Shim et al. | |
| 2012/0077010 A1 | 3/2012 | Manesis et al. | |
| 2012/0114848 A1 | 5/2012 | M ller et al. | |
| 2013/0323416 A1 | 12/2013 | Bertelo et al. | |
| 2015/0011815 A1 | 1/2015 | Ma et al. | |
| 2017/0282430 A1 | 10/2017 | Baldwin et al. | |
| 2017/0326790 A1 | 11/2017 | Lee et al. | |
| 2018/0200922 A1 | 7/2018 | DeFelice et al. | |
| 2020/0247012 A1 | 8/2020 | DeFelice et al. | |
| 2021/0277180 A1 | 9/2021 | Gardner et al. | |
| 2021/0277192 A1 | 9/2021 | Gardner et al. | |
| 2022/0363825 A1 * | 11/2022 | Kubiak | C08J 9/0004 |
| 2022/0363826 A1 * | 11/2022 | Fry | B29B 13/02 |

FOREIGN PATENT DOCUMENTS

| | | | |
|---|---|---|---|
| EP | 0431924 | A2 | 6/1991 |
| KR | 10-2016-0108820 | A | 9/2016 |
| NL | 8801276 | * | 12/1989 |
| WO | 9606881 | A2 | 3/1996 |
| WO | 0138061 | A1 | 5/2001 |
| WO | 2017033146 | A1 | 3/2017 |
| WO | 2021137086 | A1 | 7/2021 |

OTHER PUBLICATIONS

Chen, Youming et al., "Effects of Cell Size and Cell Wall Thickness Variations on the Strength of Closed-Cell Foams Using Laguerre Tessellation." 21st International Conference on Composite Materials, Aug. 2017 (15 pages).

Gendron, R. et al., "Supercritical Fluids in Thermoplastics Foaming: Facts or Fallacies?" Rapra Technology, 2006, Cellular Polymers. vol. 25, No. 4, 2006 (24 pages).

International Search Report and Written Opinion in co-pending application PCT/US2022/029424 mailed Sep. 1, 2022 (14 pages).

Jimenez, J. et al., "Foaming of PLA Composites by Supercritical Fluid-Assisted Processes: A Review." Molecules 2020, 25, 3408; doi: 10.3390/molecule25153408 (39 pages).

Jin, Fan-Long et al., "Recent Trends of Foaming in Polymer Processing: A Review." Polymers 2019, 11, 953; DOI: 10.3390/polym11060953 (23 pages).

Maloo et al.,"A Sneak Peek Toward Polyaryletherketone (PAEK) Polymer: A review", Cureus, vol. 14, No. 11, Nov. 3, 2022. (9 pages).

Migliore, Nicola et al., "Effect of the Polyketone Aromatic Pendent Groups on the Electrical Conductivity of the Derived MWCNTs-Based Nanocomposites . . . " Polymers 2018, 10, 618; doi: 10.3390/polym10060618 (16 pages).

Naitove, Matthew, "A Rare 'Resurrection' in Engineering Plastics." Plastics Technology, Published Oct. 27, 2014.

Nalawade, S. et al., "Supercritical carbon dioxide as a green solvent for processing polymer melts: Processing aspects and applications." Prog. Polym. Sci. 31 (2006) 19-43 (25 pages).

Olson, Eric, "Particle Shape Factors and Their Use in Image Analysis Part II: Practical Applications." Journal of GXP Compliance, Autumn 2011 vol. 15 No. 4 (13 pages).

Sauceau, M. et al., "New challenges in polymer foaming: A review of extrusion processes assisted by supercritical carbon dioxide." Progress in Polymer Science, (2011) 36: 749-766 (30 pages).

Schmid et al.,"Materials perspective of polymers for additive manufacturing with selective laser sintering", Journal of Materials Research, vol. 29, No. 17, Sep. 14, 2014. (1824-1832 pages).

Sichina, W.J., "Measurement of Tg by DSC." Perkin Elmer™ instruments. 2000 PerkinElmer, Inc., PETech-09 Thermal Analysis (5 pages).

Toncelli, Claudio, "Functional Polymers from Alternating Aliphatic Polyketones: Synthesis and Applications." Publication date 2013, University of Groningen (136 pages).

International Preliminary Report on Patentability issued in co-pending Application No. PCT/US2022/029422 mailed Dec. 5, 2022 (18 pages).

* cited by examiner

POLYKETONE POWDER FOR LASER SINTERING

CROSS-REFERENCE TO RELATED APPLICATIONS

This application is a National Stage 371 entry of PCT/US2022/029422 filed on May 16, 2022, published as WO2022/245721, which claims priority to U.S. Provisional Patent Application Nos. 63/189,609 filed on May 17, 2021, and 63/217,451 filed on Jul. 1, 2021, all of which are incorporated herein by reference in their entirety for all purposes.

FIELD

This disclosure relates to polymeric additive manufacturing powders comprised of aliphatic polyketone.

BACKGROUND

Aliphatic polyketones are promising polymers, in part due to their physical properties and chemical resistance as a low cost engineering plastic. Polyketones are typically copolymers of ethylene (and/or other olefins or alkenes) and carbon monoxide produced by copolymerization in the presence of a palladium (or other) catalyst such as described in U.S. Pat. No. 4,835,250 and US20080058494. The aliphatic polyketone is then typically separated from the other components that are present in a polymerization reactor. These other components may include unreacted alkene, unreacted carbon monoxide, methanol (or other) reaction medium, and catalyst. The polyketone product that is separated from the other components (by separation and drying, for example) is referred to as "reactor flake". The reactor flake due to its fine particle size causing difficulty in handling and shipping is typically heated and extruded to form pellets for commercial sale.

Powder-based methods of additive manufacturing include the following: Selective laser sintering (SLS) is a 3D-printing technique that uses a laser to fuse powder material in successive layers (see, for example, U.S. Pat. No. 5,597,589). High-speed sintering (HSS) and multi-jet fusion (MJF) 3D-printing employ multiple jets that similarly deposit successive layers of infrared-absorbing (IR-absorbing) ink onto powder material, followed by exposure to IR energy for selective melting of the powder layer. Electrophotographic 3D-printing employs a rotating photoconductor that builds the object layer-by-layer from the base.

Selective laser sintering (SLS), multi-jet fusion (MJF), and high-speed sintering (HSS) 3D-printing methods use the same type of free-floating, non-fixed powder bed. They generally have the same material requirements for compatibility with the printing process since the additively built object will experience similar stresses, only with different heating mechanisms to obtain the melt phase. Typically, a free-body diagram of a 3D printed object can be used to determine the residual stresses expected in the printed object. This is necessary for successfully building the object. If the residual stress is too high, the object will deform or be deformed beyond acceptable tolerances.

The residual stresses have typically been minimized for these powder bed-based 3D printers by using crystalline or semicrystalline thermoplastic polymers having sufficiently large window between its melting temperature and its recrystallization temperature. Unfortunately, this has limited the polymers that have successfully used to print large or complex parts using SLS and MJF methods (e.g., polyamides), thus limiting the use of these additive manufacturing methods.

Accordingly, it would be desirable to provide a thermoplastic polymer that avoids one or more problems to produce additive manufactured articles by methods such as SLS, HSS, MJF and the like such as those described above. In particular, it would be desirable to provide a thermoplastic polymer that may provide a high strength, tough, high temperature resistant, flame retardant and in some cases optically transparent article.

SUMMARY

Applicants have discovered aliphatic polyketones having certain powder morphology and thermal characteristics that allow for the additive manufacturing of these materials by floating powder bed methods. Surprisingly, in one example, the polyketone powder displays an overlapping DSC melt peak and recrystallization peak characterized in the DSC melt peak displaying a bi-modal shape or multimodal (e.g., tri, tetra or greater).

A first aspect of the invention is a composition comprising a semicrystalline polyketone powder having a bimodal melt peak determined by an initial differential scanning calorimetry (DSC) scan at 20° C./min and a $D_{90}$ particle size of at most 300 micrometers and average particle size of 1 micrometer to 150 micrometers equivalent spherical diameter. Surprisingly, these powders even though they may display overlapping melt peaks and recrystallization peaks (i.e., the onset temperature of the melt peak during heating is below the onset temperature of the recrystallization peak during cooling) may be printed by floating powder bed additive manufacturing techniques such as SLS, HSS and MJF. Likewise, these powders display good additive manufacturing recyclability even though the thermal characteristics change such as the melt peak becoming monomodal. Bimodal peak means herein that the between the onset temperature and ending temperature the peak displays two maxima and a minimum and is determinable by hand or commercially available curve fitting software.

A second aspect of the invention is composition comprised of a semicrystalline polyketone powder having a melt peak and a recrystallization peak as determined by differential scanning calorimetry (DSC) scanned at a 20° C./min heating and cooling rate, wherein the melt peak and recrystallization peak fail to overlap. Fail to overlap means that the onset temperature of the melt peak during heating is above the onset temperature of the recrystallization peak during cooling.

A third aspect of the invention is A method for forming a polyketone powder useful for making an additive manufactured article comprising;
  (i) reacting carbon monoxide and an alkene monomer in the presence of a group 8 through 10 transition metal catalyst to form a raw polyketone powder,
  (ii) recovering the raw polyketone powder,
  (iii) separating the powder to form the polyketone powder having a $D_{90}$ particle size of at most 300 micrometers and average particle size of 1 micrometer to 150 micrometers equivalent spherical diameter and an oversized polyketone powder.

The method of the third aspect is useful in preparing the composition of the first aspect of the invention. The oversized polyketone powder may be further treated by milling to realize the desired particles size and subject to further treatments to increase the crystallinity of the powder realizing for instance the composition of the second aspect. The raw powder may also be subjected to further treatment such as heating and extruding to form pellets that are subjected to further crystallization and ground to realize the composition of the second aspect.

A fourth aspect of the invention is a method to form an article comprising heating the composition of aspects one or two to a temperature sufficient to melt and bond the polyketone powder of said composition to form the article. The method is particularly useful for forming an article by additive manufacturing methods such as floating powder bed methods (e.g., SLS, HHS and MJF methods).

A fifth aspect of the invention is an article comprised of fused particles of the first and second aspect compositions. The article is desirably an article of fused particle within and between layers such as those formed when additive manufactured.

The compositions may be made into additive manufactured articles taking advantage of the properties of this engineering plastic (e.g., heat resistance and chemical resistance). Examples of such application include biocompatible (medical), electrical, transportation (e.g., automotive, rail, trucking), plumbing, aerospace, food contact, industrial (e.g., machinery) and consumer (e.g., appliances) applications.

DETAILED DESCRIPTION

The explanations and illustrations presented herein are intended to acquaint others skilled in the art with the invention, its principles, and its practical application. The specific embodiments of the present disclosure as set forth are not intended to be exhaustive or limit the scope of the disclosure.

One or more as used herein means that at least one, or more than one, of the recited components may be used as disclosed. It is understood that the functionality of any ingredient or component may be an average functionality due to imperfections in raw materials, incomplete conversion of the reactants and formation of by-products.

It has been discovered that compositions of polyketone powders useful for floating powder bed additive manufacturing methods may be formed by the reaction of carbon monoxide, an alkene monomer in the presence of a group 8 to 10 transition metal catalyst. In particular, the method may be any one of those described in U.S. Pat. Nos. 4,835,250; 4,894,435 and 5,138,032 and US Pat. Publ. No. 2008/0058494 each incorporated by reference in its entirety. In particular, the method, reaction conditions and monomers are those described in U.S. Pat. No. 5,138,032 from col. 2 line 52 to col. 5, line 17 specifically incorporated herein by reference. Examples of such catalysts include cobalt, nickel and palladium.

Desirably, the alkene monomer is comprised of an olefin having from 2 to 12, 8 or 6 carbons. Illustratively, the alkene monomer is ethylene or the alkene monomer comprises ethylene and at least one other olefin monomer such as propylene. When the polyketone is a copolymer of ethylene and another olefin monomer (e.g., propylene), the amount of ethylene and other olefin may be as described in U.S. Pat. No. 5,138,032 from col. 2, line 17 to col. 3, line 14.

The composition of the first aspect is comprised of a semicrystalline polyketone powder having a bimodal melt peak determined by an initial differential scanning calorimetry (DSC) scan at 20° C./min. As described above the semicrystalline polyketone powder may be formed by recovering the powder directly from the reactor and any purification methods such as those known in the art (e.g., washing) and described in the aforementioned references followed by separating the powder to realize a desired powder size and size distribution.

The classifying or separating of the raw polyketone powder particles from the reactor may be performed by any suitable method such as those known in the art to form the polyketone having the desired particle size and morphology. Illustratively, the raw particles are screened to remove any oversized or undersized particles and the size distribution may be varied accordingly. Other size classification methods may also be employed such as centrifugation, sedimentation and air cyclones.

Surprisingly, the crystallization or recrystallization peak (used herein interchangeably) may overlap with the melt peak in the initial DSC scan of the polyketone powder and still yield a powder that can be additive manufactured with good properties and without warping or distortion.

The polyketone powder's crystallizaton temperature (Tc) is below the melt temperature (Tm) of the semi-crystalline polymer as determined by the peak of the melt and crystallization peak and in the case of a bimodal peak by the lower temperature peak. Generally, the Tc of the polyketone is about 10° C. to 40 or 50° C. below Tm. The Tm and Tc is determined from the melt peak of the DSC by as described by ASTM D3418 using the midpoint of the melt peak. The onset of the Tm and Tc peaks likewise are determined as per ASTM D3418 (i.e., deviation of the scan from linear).

The polyketone powder derived directly may have a morphology allowing for it to be additive manufactured in the absence of a flow aid. Desirably, the polyketone having such desirable flow characteristics have a sphericity In terms of particle shape, and in particular particle roundness, which aids in flowability, and as derived from micrograph images of individual particles, may be expressed in terms of circular character, or circularity, where individual particle circularity is defined as the $4\pi A/P^2$, where A is the area of the particle and P is the perimeter length of the particle, both as viewed from a random perspective. Sphericity, a related parameter, is derived as the square root of circularity. Circularity is a numerical value greater than zero and less than or equal to one. A perfectly circular particle is referred to as having a circularity of 1.00. Tables of population circularity data are represented in such a way that various levels of circularity (e.g., 0.65, 0.75, 0.85, 0.90, and 0.95) are accompanied by percentages of the particle sample population with a circularity greater than the tabulated value. The circularity is determined at a solidity filter level of 0.9 or 0.95. Solidity filter is a filter used to remove overlapping particles in a 2-dimensional micrograph available in commercial image analysis software. Solidity in essence is the area of a particle over the area (particle area) of an area defined by the major and minor axis of the particle area in a 2-dimensional micrograph. Particle size and shape can be measured by any suitable methods known in the art to measure particle size by diameter. In some embodiments, the particle size and shape are determined by laser diffraction as is known in the art. For example, particle size can be determined using a laser diffractometer such as the Microtrac S3500 with static image analysis accessory using PartAnSI software to analyze the captured images of the particles. Desirably, at least about 65%, 70%, 80%, 95% or 99% of the particles (by number) have a circularity is at least about 0.8, 0.85, 0.9 or 0.95 for the powders separated and classified from the reactor without further treatment other than purification.

Likewise, the polyketone powders separated and classified directly from the reactor without the addition of any flow aid generally have a flowability of at least about 0.5 g/s, 1 g/s or 2 g/s to any practically achievable rate (e.g., 50 g/s) using a 15-mm nozzle as determined by Method A of ASTM D 1895.

In another illustration of the polyketone powders of this invention, the oversized polyketone powders from the reactor may be subjected to a size reduction process and, if desired, further separation and classification. The size reduction may be carried out by any suitable method such as those known in the art. Illustratively, milling at a temperature where the semicrystalline polyketone becomes embrittled may be used and is commonly referred to as cryomilling. Generally, the temperature for cryomilling may be any temperature below about 0° C., –25° C., –50° C. to about –75° C., –100° C., –150° C., or –190° C. In an embodiment, the cooling is provided by using dry ice or liquid nitrogen. These powders, because of the size reduction process may have a decreased flowability and circularity, but nevertheless may be used to form desirable additive manufactured articles when used with processing aids known in the art such as flow aids.

Another illustration of the polyketone powder of this invention is one where the polyketone powder from the reactor is subjected to heating and shaping in an extruder to form pellets. The pellets may then be reduced in size as described in the previous paragraph and any desired separation and classification. Because of the subsequent thermal history after formation in the reactor, these powders tend to have a monomodal Tm as well as little or no overlap of melt and crystallization peak. Likewise, since they have also been subject to a size reduction they tend to have a similar morphology as described for the oversized reactor powder.

The aforementioned semicrystalline polyketones of the invention have a crystallinity of at least about 15% by weight to essentially crystalline, with higher degrees of crystallinity being desirable. Desirably, the crystallinity is anywhere from 20%, 25% or 30% to essentially crystalline, 90%, 80%, 75%, 60% or 55%. The crystallinity may be determined by any suitable methods such as those known in the art. Illustratively, the percent crystallinity may be determined by x-ray diffraction including, for example, wide angle x-ray diffraction (WAXD), such as by using a Rigaku SmartLab x-ray diffractometer, or by differential scanning calorimetry (DSC), such as by using a TA Instruments DSC250 differential scanning calorimeter ASTM D3418-15.

In another illustration, any of the aforementioned polyketone powders may be subjected to treatment to increase the crystallinity of the polyketone powder. Such treatments may include any suitable treatments including dissolving and precipitation of the polymer or heating to a temperature below where the polyketone sinters or melts, which is generally below and within about 20° C. of melt peak onset temperature. The atmosphere may be any useful to prevent the degradation of the polyketone, but may be air, dry air, inert gas (e.g., nitrogen or noble gas). Examples of such methods are described in copending U.S. Prov. Appl. Nos. 63/208,243 and 63/147,822.

The further crystallized polyketone powders may display a DSC scan where the melt and crystallization peaks fail to overlap. The gap between the temperatures of the onset of the melt and crystallization peak may be from 5, 10 or even 20 to 50° C. The treatment to increase the crystallization may also retain or improve the morphology of the powders akin to those described for the polyketone powders classified directly from the reactor as described above. For example, the heat treatment to increase the crystallinity may cause the particles to have a smoother surface and concomitantly increased circularity as described above, which may result in such powders having flowability sufficient for floating bed additive manufacturing methods in the absence of a flow aid.

The polyketone may have any DSC melt peak enthalpy useful for making a powder useful in additive manufacturing such as SLS. Typically, enthalpy is at least 3 joules/gram, but desirably is at least 5, 10, 20, 30, 40 or 50 joules/gram or more to any practical amount such as 200 joules/gram. The enthalpy of the DSC melt peak may be determined according to the manner described by ASTM D3418.

The polyketone of the composition is comprised of repeating units represented by where A is the residue of an alkene monomer converted to a saturated hydrocarbon group, m is from about 1 to 6 and n is at least about 2 to any practicable amount to realize the desired number average molecular weight useful in the invention. Exemplary useful number average molecular weights may be those that provide melting temperatures from about 175° C. or 210° C. to about 270° C. or 300° C. and may be from about 1000 to 250,000 or about 10,000 to 200,000 g/mole.

The polyketone of the composition desirably is one that is a terpolymer of carbon monoxide, ethylene and another alkene monomer (e.g., olefin of 3 to 12, 8 or 6 carbons and in particular propylene). Such polyketone may be represented by random repeating units:s Where G is the saturated residue of an olefin of 3 to 12, 8 or 6 carbons polymerized through the double bond and x/y is at least 2 to 100 or 50 or 20. Desirably, G is propylene.

Illustratively, the ratio of ethylene to other alkene may desirably be 2 to 100 by weight. The polyketone may be terminated by any useful group such as alkyl group, hydroxyl, ester, carboxylic acid, ether or combination thereof. The particular terminating group may arise from using a solvent such as a low molecular alcohol such as methanol or water or combination thereof.

The semicrystalline polyketone of the aforementioned particles generally have a particle size and size distribution that is useful for making additive manufactured articles and typically have an average or median particle size ($D_{50}$), by volume, from about 1 micrometer (μm), 10 μm, 20 μm, 30 μm or 40 μm to 150 μm, 125 μm, 110 μm or 100 μm. Likewise, to enable consistent heating and fusion of the powder, it desirably has a $D_{90}$ of at most 300 μm, 200 μm or 150 am. To aid in flowability the polyketone desirably has a $D_{10}$ of at least 0.1 μm, 0.5 am or 1 am by volume. $D_{90}$ means the particle size (equivalent spherical diameter) in the particle size distribution, where 90% by volume of the particles are less than or equal to that size; similarly, $D_{50}$ means the particle size (equivalent spherical diameter) in the particle size distribution, where at least 50% by volume of the particles are less than that size, and $D_{10}$ means the particle size (equivalent spherical diameter) in the particle size distribution, where at least 10% by volume of the particles are less than that size. The particle size may be determined by any suitable method such as those known in the art including, for example, laser diffraction or image analysis of micrographs of a sufficient number of particles (~100 to ~200 particles). A representative laser diffractometer is one produced by Microtrac such as the Microtrac S3500.

The compositions of this invention may further comprise useful additives such as those known in the art for making articles such as additive manufactured articles. The composition may also be comprised of a further thermoplastic polymer powder useful for additive manufacturing such as polyamides (e.g., Nylon 6; Nylon 6,6; Nylon 4,6; Nylon 6,9; Nylon 5,10; Nylon 6,10; Nylon 11; Nylon 6,12 and Nylon 12) or polyesters. For example, the composition may have one or more of an ultraviolet (UV) stabilizer, filler, lubricant, plasticizer, pigment, flow aid, flame retardant, or solvent. Desirably, the composition is essentially free of solvent (i.e., at most a trace amount, which may be at most 10 parts per million (ppm) by weight of the composition, 1 ppm). The amount of any particular additive may be any useful amount to realize a particular property for printing or characteristic of the article formed therefrom. Generally, the amount of the additive or additives, when present, is at most about 50%, 25%, 10% or 5% by volume of the composition. The flow aid may be any known compound for improving the flowability of powders with fumed silica being an example (e.g., Aerosil 200).

The filler may be any useful filler such as those known in the art. Examples of the filler ceramics, metals, carbon (e.g., graphite, carbon black, graphene), polymeric particulates that do not melt or decompose at the printing temperatures (e.g., cross-linked polymeric particulates, vulcanized rubber particulates and the like), plant based fillers (e.g., wood, nutshell, grain and rice hull flours or particles). Exemplary fillers include calcium carbonate, talc, silica, wollastonite, clay, calcium sulfate, mica, inorganic glass (e.g., silica, alumino-silicate, borosilicate, alkali alumino silicate and the like), oxides (e.g., alumina, zirconia, magnesia, silica "quartz", and calcia), carbides (e.g., boron carbide and silicon carbide), nitrides (e.g., silicon nitride, aluminum nitride), combinations of oxynitride, oxycarbides, or combination thereof. In certain embodiments, the filler comprises an acicular filler such as talc, clay minerals, chopped inorganic glass, metal, or carbon fibers, mullite, mica, wollastonite or combination thereof. In a particular embodiment, the filler is comprised of talc.

It has been discovered that the polyketone of the compositions of this invention allow for the formation of shaped articles that do not deform or possess undesirable amounts of residual stress. For example, but not limited to, the compositions of this invention may be made into a body by an additive manufacturing method such as SLS, MJF, HSS or electrophotography. Illustratively, in SLS, a layer of the composition of this invention may be deposited on a bed at a fixed temperature below the melting temperature of the polyketone powder and a predetermined (selected) area of the bed is sintered (fused) together using a heating source such as a laser controlled and directed as described above. Layers are then in succession deposited and sintered to the preceding layer and within the layer to build up an additive manufactured part.

Surprisingly, the polyketone powders of the compositions, fuse together even when displaying overlap of the melt and crystallization peak without deformation or have undesirable amounts of residual stresses within the layer and in particular between the layers of additive manufactured part. It is not understood why this behavior is observed, but, without being limiting, may be due to the presence of a bimodal melt peak in some instances. Typically, the "operating window" for additive manufacturing semicrystalline thermoplastic polymers is the temperature difference between the onset temperature at which the material melts to the onset temperature at which it recrystallizes ("Tc"), which should be a large as possible. As described the further crystallized polyketones may be further optimized wherein the operating window may be anywhere from 10° C., 15° C., or 20° C. to 60° C., 50° C., 30° C., or 25° C.

Because the polyketone powders of the compositions of this invention display good 3d printability even when there is overlap of the melt peak and crystallization peak, they may be recycled and reused without further treatments after being printed by powder additive manufacturing methods that involve heating and maintaining the bed of powder just below the onset melt temperature of the polyketone. If desired the recycled powder may be mixed with any of the polyketone powders described herein that have not yet been additive manufactured to realize desired printability characteristics or part properties. The proportion of recycled polyketone making up the compositions of this invention may be any amount from essentially all of the composition, 90%, 75%, 50%, 40% or 30% to about 1, 5% or 10% being recycled by weight of the polyketone powder of the composition. The thermal characteristics of the recycled powders generally are as described above for the polyketone that has been pelletized reduced in size to for the polyketone powder of this invention. The morphology and size distribution likewise are as described herein with the morphology being most akin to the morphology of the particular initial polyketone powder used to form the additive manufactured article.

The compositions of this invention may be used to make an additive manufactured article comprised of a plurality of fused polyketones of this invention. In particular, the compositions may be used to make additive manufactured articles made by the sequential selective heating of powder layers that fuse the particles within and between the layers such as in SLS, HSS and MJF.

EXAMPLES

Example 1

Figure 1:
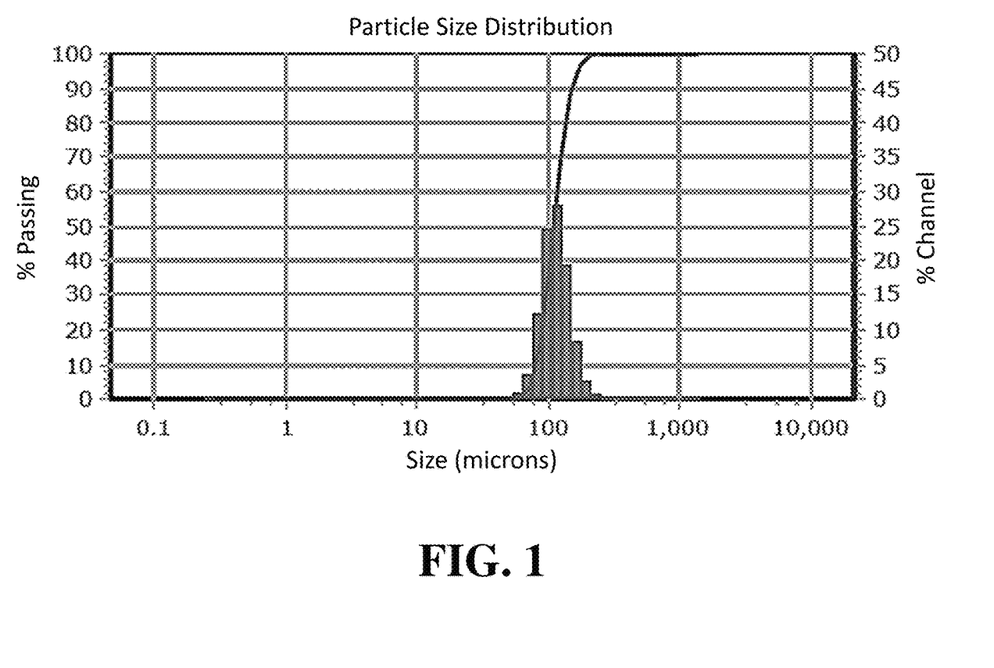
FIG. 1 is a plot of the particle size distribution of a polyketone powder of the composition of this invention.
Figure 2:
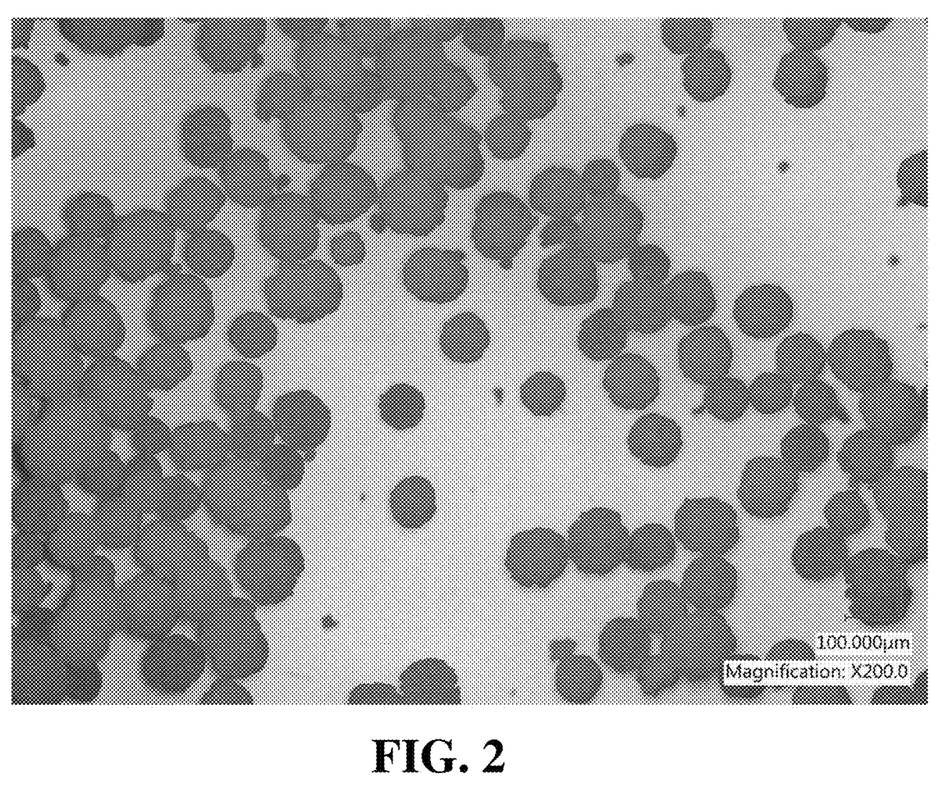
FIG. 2 is an optical micrograph of a polyketone powder of the composition of this invention.
Figure 3:
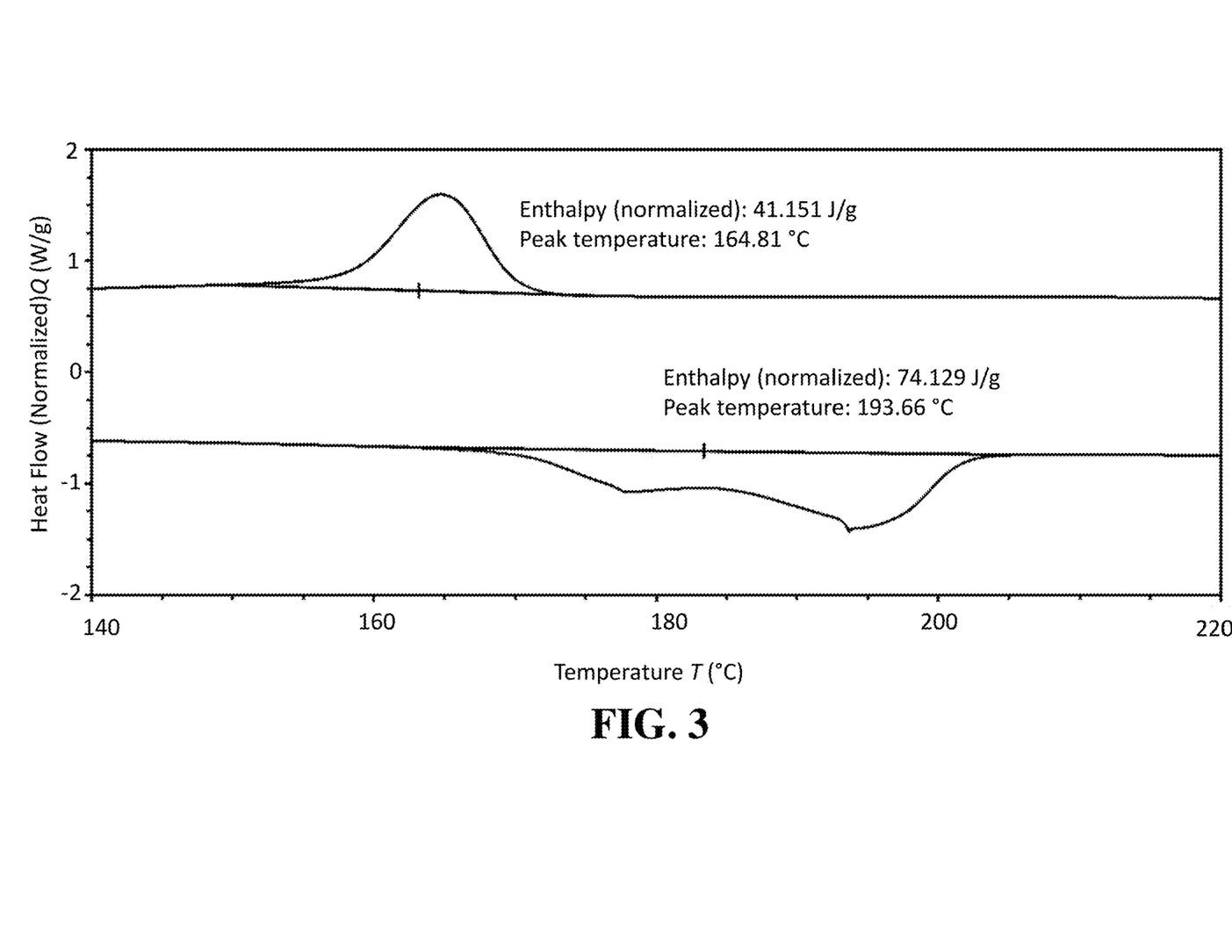
FIG. 3 is a differential scanning calorimetry plot of a polyketone powder of the composition of this invention

Polyketone powder is made by a process in the manner described in U.S. Pat. No. 5,138,032 from col. 2 line 52 to col. 5, line 17. The powder directly from the reactor is screened with a screen having 150 micrometer openings to form a polyketone powder having the particle size and particle size distribution by volume as shown in FIG. 1, measured using a Microtrac S3500 in water and an oversized polyketone powder (particles that did not pass through the screen). The D10 is about 82 micrometers, the D50 is about 110 micrometers and the D90 is about 152 micrometers. The shape and morphology of the powder is shown in the optical micrograph of FIG. 2, where it is evident that the particles are quite uniform and substantially circular with a mean circularity of greater than 0.9. The melting and crystallization peaks are shown the DSC scan in FIG. 3, where it is evident that the melt peak is bimodal and the crystallization and melt peak overlap.

The polyketone powder is printed using a Farsoon ST252P SLS printer. The printed parts (e.g., mechanical test dog bone samples) printed without distortion and had good surface finish and properties as shown in Table 1.

TABLE 1

| Sample # Units | Orientation XY, YX, ZX, or ZY | Conditioned Type Dry or 23° C. @ 50% RH for 40 hrs | Modulus (Automatic Young's) (MPa) | Maximum Tensile stress (MPa) | Tensile strain (Displacement) at Break (Standard/crosshead) (%) |
|---|---|---|---|---|---|
| 1 | YX | 23° C. @ 50% RH for 40 hrs | 1161.79 | 44.3 | 20.66 |
| 2 | YX | 23° C. @ 50% RH for 40 hrs | 1137.3 | 44.05 | 19.99 |
| 3 | YX | 23° C. @ 50% RH for 40 hrs | 1147.87 | 44.88 | 22.62 |
| 4 | YX | 23° C. @ 50% RH for 40 hrs | 1172.19 | 43.6 | 22.26 |
| 5 | YX | 23° C. @ 50% RH for 40 hrs | 1230.95 | 45.21 | 23.8 |
| 6 | XY | 23° C. @ 50% RH for 40 hrs | 1168.31 | 46.53 | 18.1 |
| 7 | XY | 23° C. @ 50% RH for 40 hrs | 1176.18 | 46.82 | 18.3 |
| 8 | XY | 23° C. @ 50% RH for 40 hrs | 1209.75 | 47.12 | 19.47 |
| 9 | XY | 23° C. @ 50% RH for 40 hrs | 1186.85 | 46.92 | 15.6 |
| 10 | XY | 23° C. @ 50% RH for 40 hrs | 1204.44 | 47.47 | 17.07 |
| 11 | Z | 23° C. @ 50% RH for 40 hrs | 1090.47 | 38.4 | 8.71 |
| 12 | Z | 23° C. @ 50% RH for 40 hrs | 1132.05 | 37.92 | 7.66 |
| 13 | Z | 23° C. @ 50% RH for 40 hrs | 1290.09 | 38.69 | 8.06 |
| 14 | Z | 23° C. @ 50% RH for 40 hrs | 1211.87 | 37.7 | 7.44 |
| 15 | Z | 23° C. @ 50% RH for 40 hrs | 1184.92 | 39.13 | 8.67 |
| 16 | Z | 23° C. @ 50% RH for 40 hrs | 1213.47 | 37.77 | 8.03 |
| 17 | Z | 23° C. @ 50% RH for 40 hrs | 1155.78 | 37.74 | 7.83 |
| 18 | Z | 23° C. @ 50% RH for 40 hrs | 1100.54 | 39.16 | 9 |
| 19 | Z | 23° C. @ 50% RH for 40 hrs | 1182.66 | 37.86 | 8.33 |
| 20 | Z | 23° C. @ 50% RH for 40 hrs | 1174.14 | 38.13 | 8.05 |

RH—relative humidity.

Example 2

Figure 4:
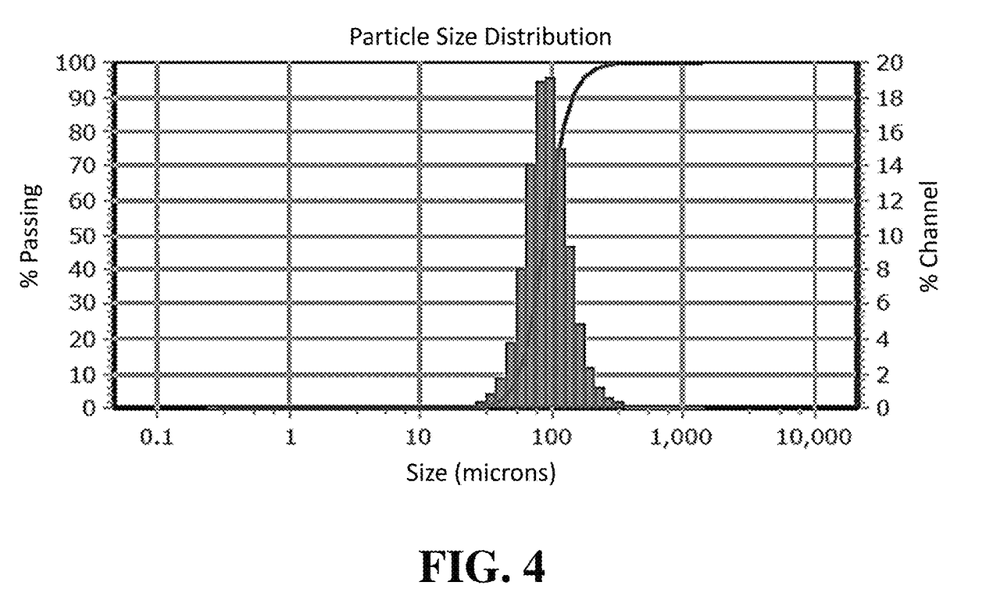
FIG. 4 is a plot of the particle size distribution of a polyketone powder of the composition of this invention.
Figure 5:
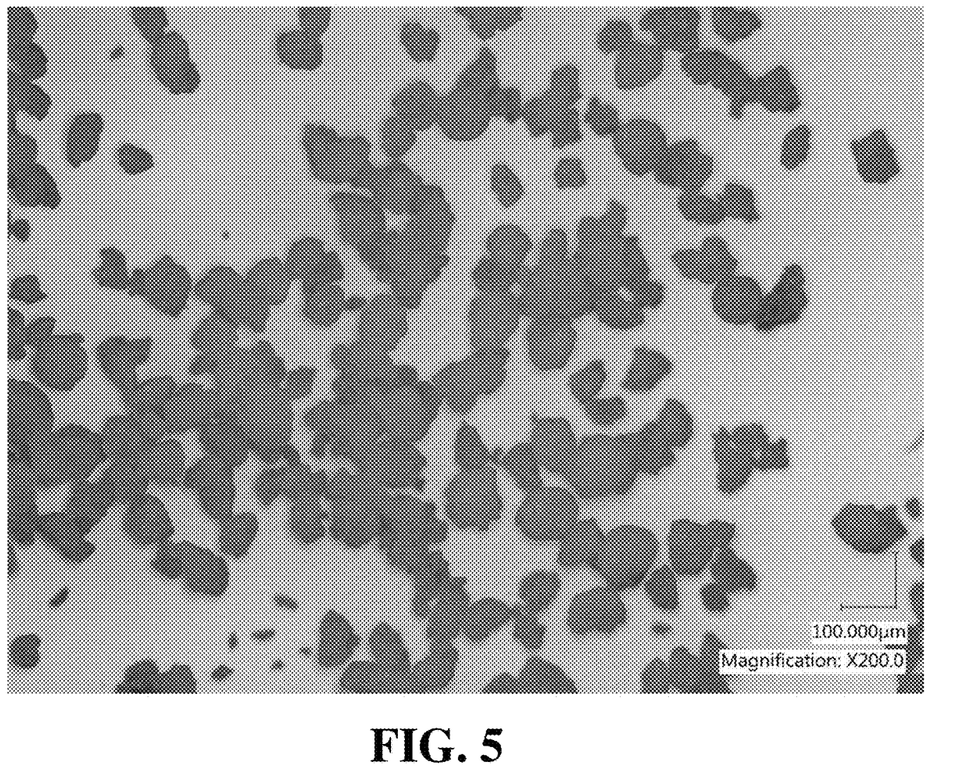
FIG. 5 is an optical micrograph of a polyketone powder of the composition of this invention.
Figure 6:
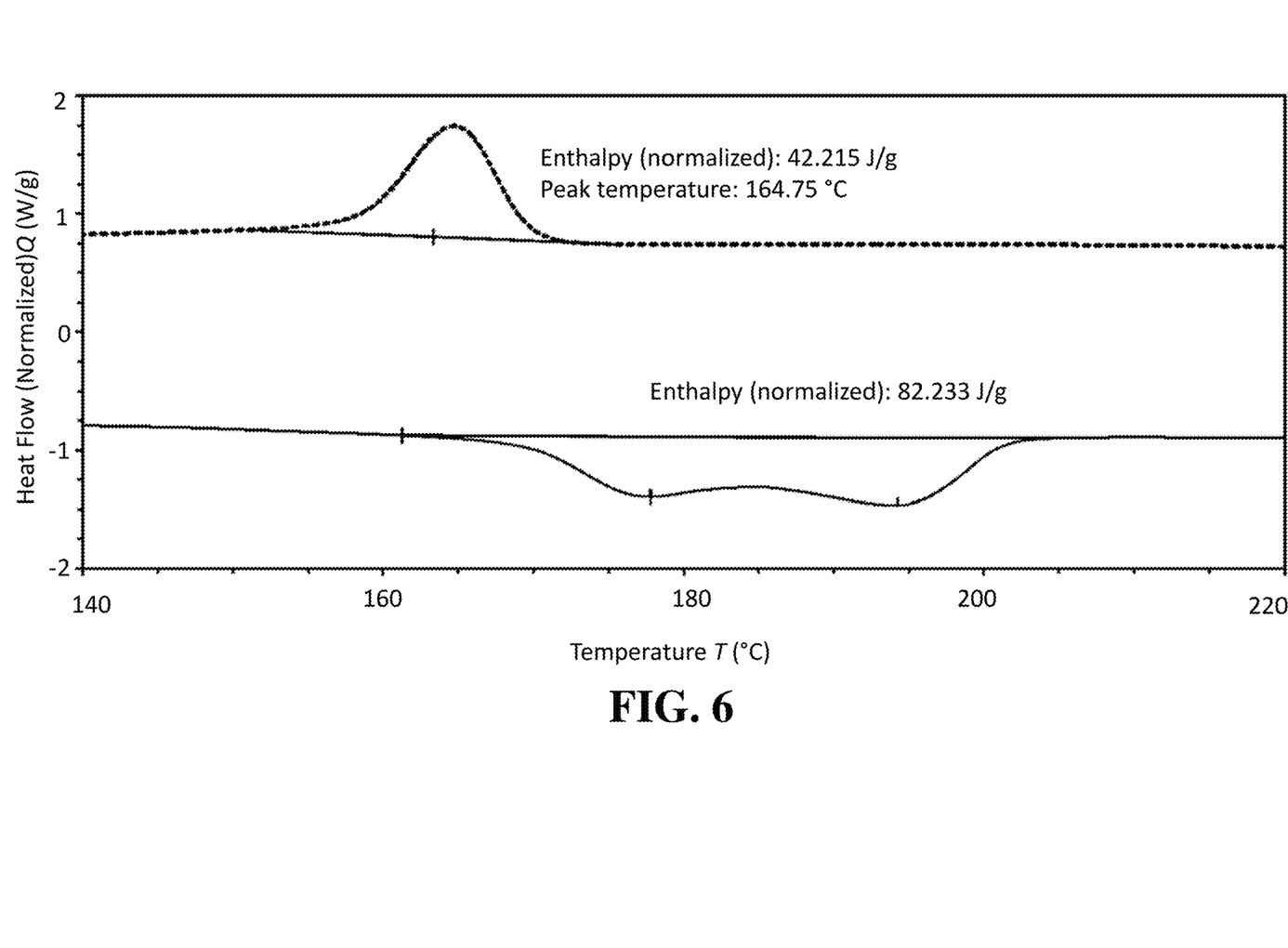
FIG. 6 is a differential scanning calorimetry plot of a polyketone powder of the composition of this invention

The oversized polyketone powder is cryomilled for a time to produce a polyketone powder having the particle size and size distribution, particle morphology and thermal characteristics shown in FIGS. 4-6. The D10 of the powder is about 57 micrometers, the D50 is about 90 micrometers and the D90 is about 170 micrometers. Again, it is quite evident that the polyketone powder has a bimodal melt peak and overlap between the crystallization and bimodal melt peak. This powder is printed in the same manner as Example 1 without distortion and good mechanical properties as shown in Table 2.

TABLE 2

| Sample # Units | Orientation XY, YX, ZX, or ZY | Conditioned Type Dry or 23° C. @ 50% RH for 40 hrs | Modulus (Automatic Young's) (MPa) | Maximum Tensile stress (MPa) | Tensile strain (Displacement) at Break (Standard/crosshead) (%) |
|---|---|---|---|---|---|
| 1 | XY | Dry | 1262.57 | 49.19 | 15.72 |
| 2 | XY | Dry | 1254 | 48.97 | 18.33 |
| 3 | XY | 23° C. @ 50% RH for 40 hrs | 1128.52 | 47.39 | 14.17 |
| 4 | XY | 23° C. @ 50% RH for 40 hrs | 1027.81 | 47.02 | 15.63 |
| 5 | XY | 23° C. @ 50% RH for 40 hrs | 1017.5 | 46.97 | 15.74 |
| 6 | XY | 23° C. @ 50% RH for 40 hrs | 997.35 | 47.53 | 16.22 |
| 7 | XY | Dry | 1224.21 | 49.24 | 17.02 |
| 8 | XY | Dry | 1239.58 | 49.92 | 15.83 |
| 9 | XY | Dry | 1259.42 | 49.96 | 17.38 |

TABLE 2-continued

| Sample # Units | Orientation XY, YX, ZX, or ZY | Conditioned Type Dry or 23° C. @ 50% RH for 40 hrs | Modulus (Automatic Young's) (MPa) | Maximum Tensile stress (MPa) | Tensile strain (Displacement) at Break (Standard/crosshead) (%) |
|---|---|---|---|---|---|
| 10 | XY | 23° C. @ 50% RH for 40 hrs | 989.69 | 48.39 | 16.97 |
| 11 | XY | 23° C. @ 50% RH for 40 hrs | 1039.48 | 48.55 | 15.54 |
| 12 | XY | 23° C. @ 50% RH for 40 hrs | 1079.67 | 48.36 | 15.31 |
| 13 | XY | 23° C. @ 50% RH for 40 hrs | 1124.39 | 48.03 | 14.53 |
| 14 | XY | Dry | 1228.59 | 49.61 | 15.96 |
| 15 | XY | Dry | 1268.87 | 49.5 | 15.05 |
| 16 | XY | Dry | 1249.07 | 49.75 | 19.16 |
| 17 | XY | Dry | 1234.99 | 50.07 | 19.16 |
| 18 | XY | 23° C. @ 50% RH for 40 hrs | 1112.01 | 48.43 | 16.12 |
| 19 | XY | 23° C. @ 50% RH for 40 hrs | 1078.49 | 47.09 | 16.18 |
| 20 | XY | 23° C. @ 50% RH for 40 hrs | 1079.85 | 47.92 | 16.06 |

Example 3

Figure 7:
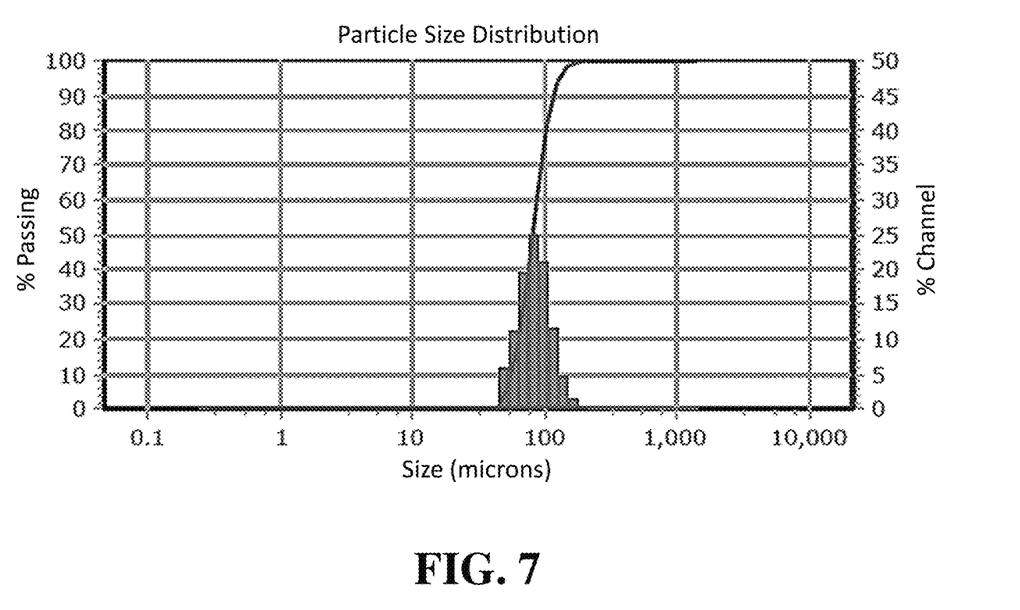
FIG. 7 is a plot of the particle size distribution of a polyketone powder of the composition of this invention.
Figure 8:
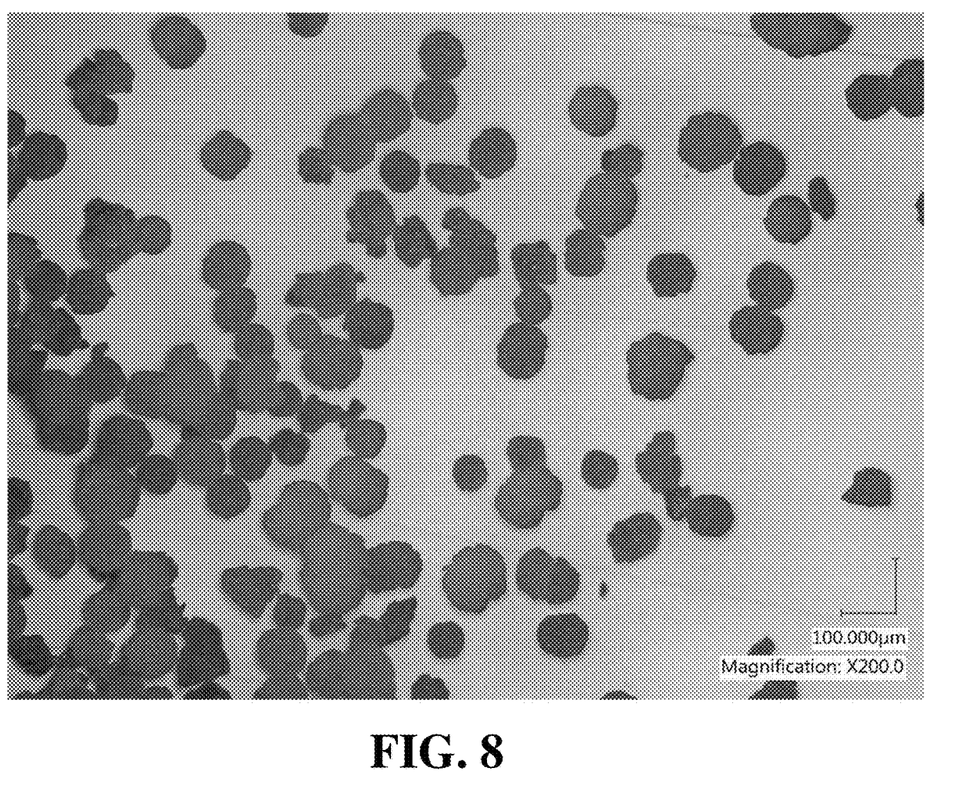
FIG. 8 is an optical micrograph of a polyketone powder of the composition of this invention.
Figure 9:
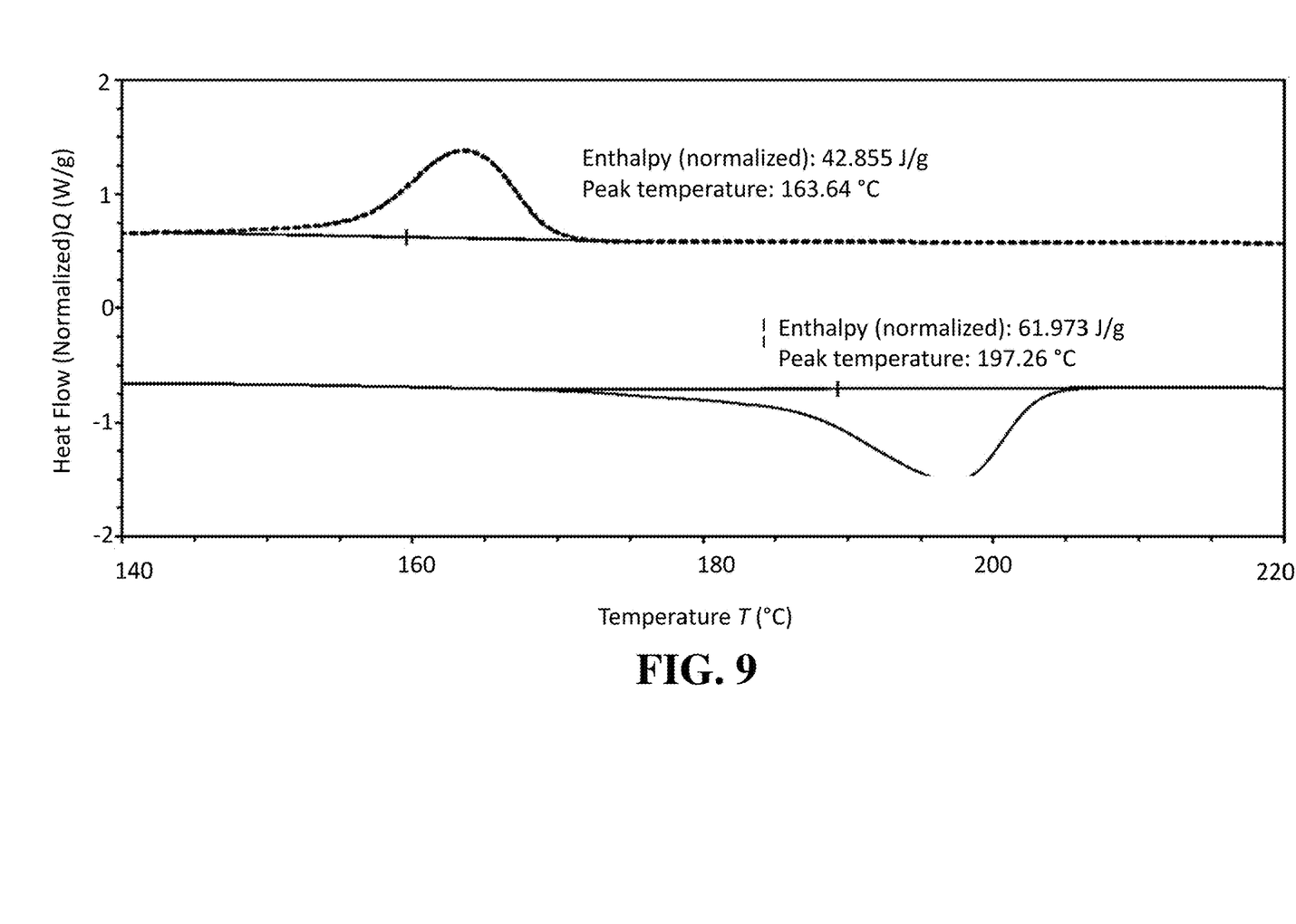
FIG. 9 is a differential scanning calorimetry plot of a polyketone powder of the composition of this invention.

70% by weight of recycled powder from the printing of the samples in Example 1 are mixed with 30% by weight of the polyketone powder of Example 1 to form a 70% recycled polyketone powder. The particle size and size distribution, particle morphology and thermal characteristics are shown in FIGS. 7 to 9. This powder is printed in the same manner as Example 1 and the parts showed no distortion with the properties as shown in Table 3. From the Figures, the bimodality of the melt peak is not evident, but it may be that the 30% attributed to the powder of Example 1 or the thermal history of the recycled powder causes the lower temperature tail of the melt peak, which again overlaps the crystallization peak. In other words, without being limiting, the overlap may be due to a short time above the melting temperature experienced during the print process or the SLS powder bed hold temperature that is below the melt temperature of the polyketone.

Example 4

Figure 10:
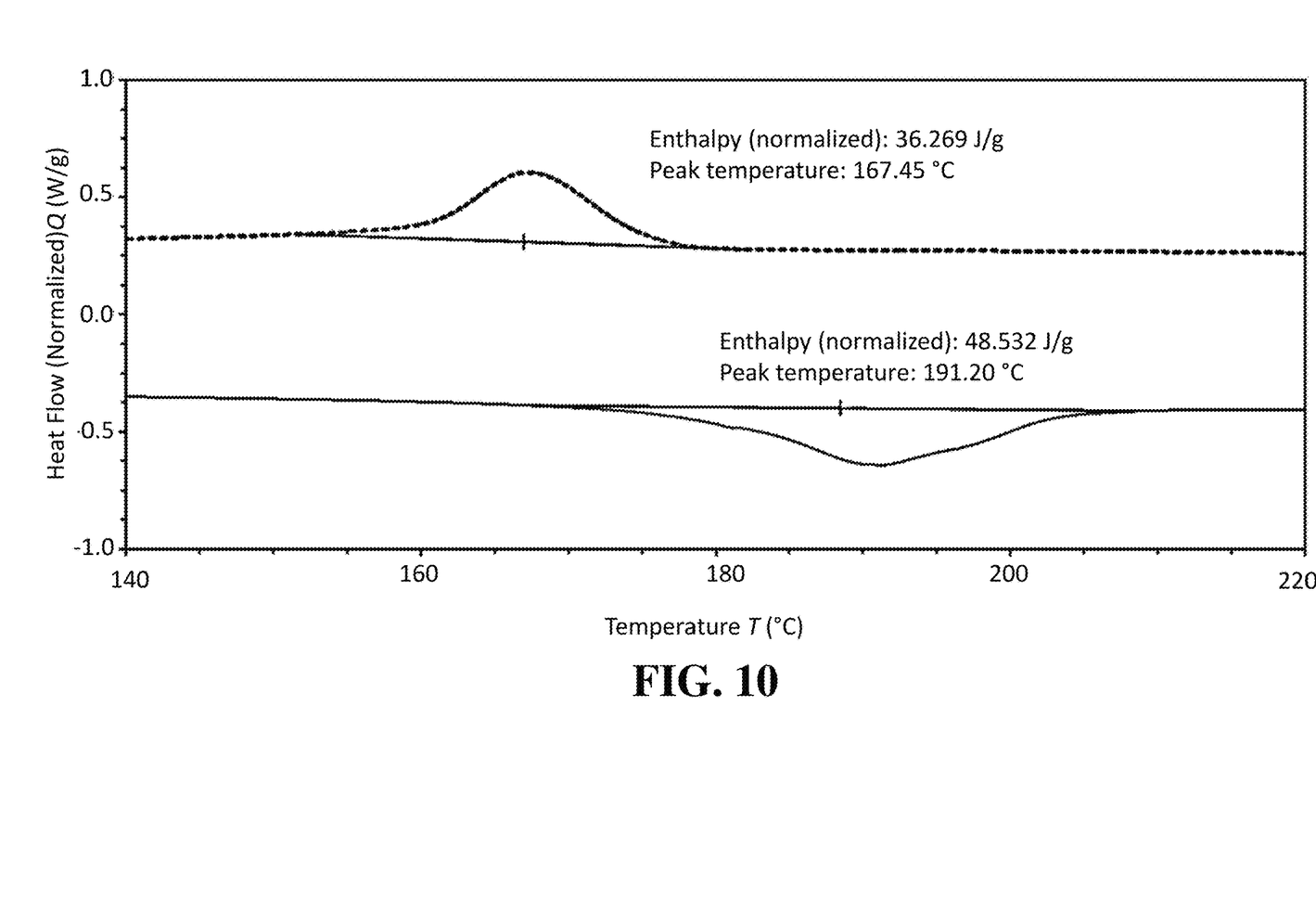
FIG. 10 is a differential scanning calorimetry plot of a polyketone powder of the composition of this invention.

The raw polyketone powder from Example 1 is pelletized in an extruder. The polyketone pellets are cryomilled and screened as in Example 1. The powder's thermal characteristics are shown in FIG. 10. From the Figure it is evident that the melt peak is essentially monomodal, but still overlaps the crystallization peak.

Example 5

Figure 11:
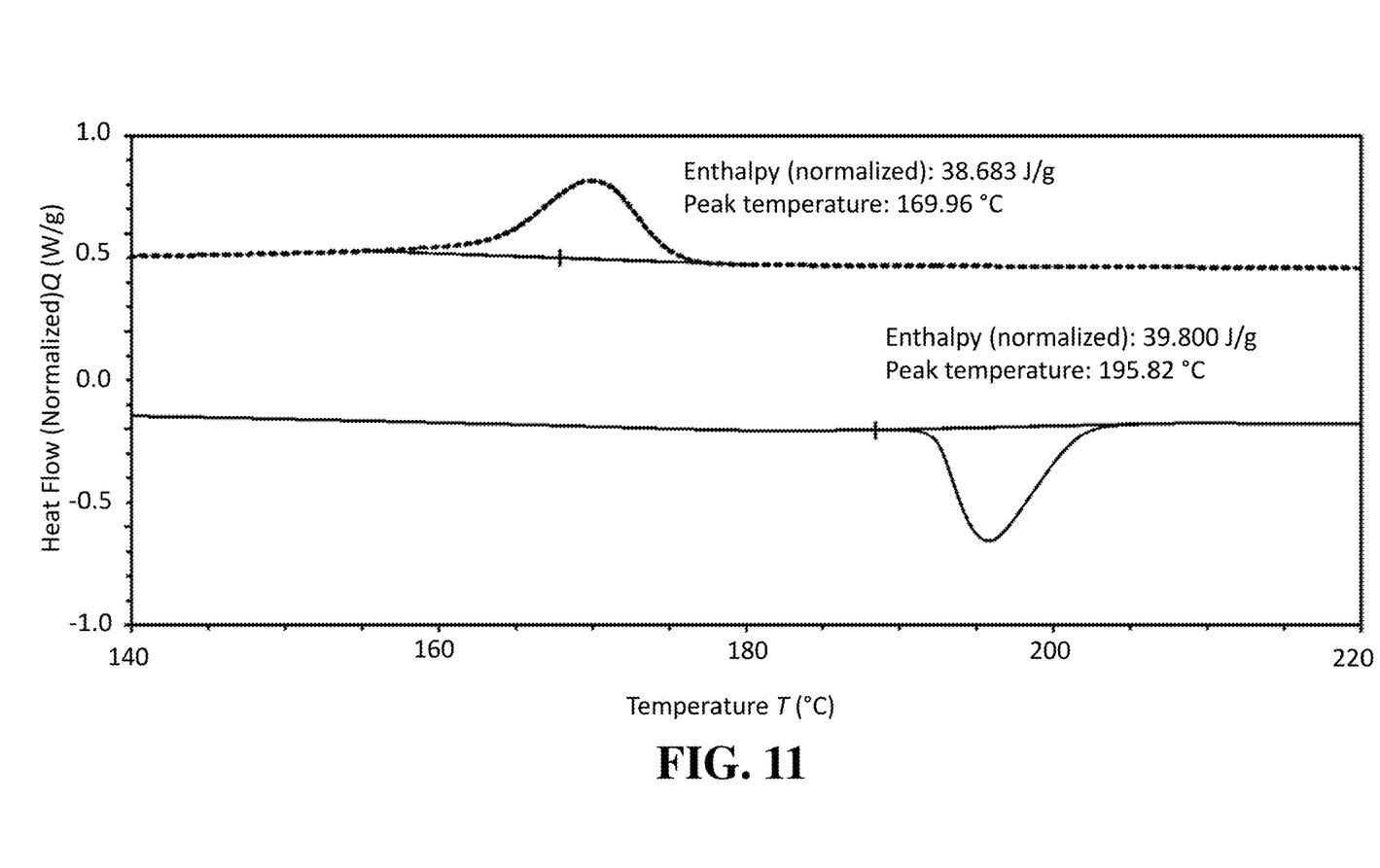
FIG. 11 is a differential scanning calorimetry plot of a polyketone powder of the composition of this invention.

The polyketone pellets of Example 4 are further crystallized by heating in air at 185° C. for 4 hours. The powder's thermal characteristics are shown in FIG. 11. From the Figure it is evident that the melt peak is clearly more distinct and no overlap of the melt peak and crystallization peak is evident with the gap between being about 15° C.

What is claimed is:

1. A composition comprising an aliphatic semicrystalline polyketone powder comprising a mixture of a first aliphatic semicrystalline polyketone powder having a bimodal melt peak determined by an initial differential scanning calorim-

TABLE 3

| Sample # Units | Orientation XY, YX, ZX, or ZY | Conditioned Type Dry or 23° C. @ 50% RH for 40 hrs | Modulus (Automatic Young's) (MPa) | Maximum Tensile stress (MPa) | Tensile strain (Displacement) at Break (Standard/crosshead) (%) |
|---|---|---|---|---|---|
| 1 | YX | 23° C. @ 50% RH for 40 hrs | 1106.89 | 45.81 | 15.54 |
| 2 | YX | 23° C. @ 50% RH for 40 hrs | 1093.86 | 46.31 | 18.52 |
| 3 | YX | 23° C. @ 50% RH for 40 hrs | 1099.83 | 45.63 | 18.07 |
| 4 | YX | 23° C. @ 50% RH for 40 hrs | 1063.57 | 45.86 | 17.91 |
| 5 | YX | 23° C. @ 50% RH for 40 hrs | 1068.85 | 45.98 | 20.1 |
| 6 | XY | 23° C. @ 50% RH for 40 hrs | 1055.64 | 46.75 | 16.45 |
| 7 | XY | 23° C. @ 50% RH for 40 hrs | 1090.09 | 46.79 | 15.81 |
| 8 | XY | 23° C. @ 50% RH for 40 hrs | 1063.91 | 46.81 | 13.29 |
| 9 | XY | 23° C. @ 50% RH for 40 hrs | 1110.78 | 46.81 | 13.62 |
| 10 | XY | 23° C. @ 50% RH for 40 hrs | 1095.45 | 47.14 | 15.9 |
| 11 | Z | 23° C. @ 50% RH for 40 hrs | 1062.35 | 41.26 | 9.55 |
| 12 | Z | 23° C. @ 50% RH for 40 hrs | 1072.42 | 41.37 | 9.32 |
| 13 | Z | 23° C. @ 50% RH for 40 hrs | 1080.95 | 41.73 | 9.24 |
| 14 | Z | 23° C. @ 50% RH for 40 hrs | 1018.24 | 43.33 | 11.6 |
| 15 | Z | 23° C. @ 50% RH for 40 hrs | 1048.12 | 44.41 | 11.99 |
| 16 | Z | 23° C. @ 50% RH for 40 hrs | 1047.36 | 41.32 | 9.15 |
| 17 | Z | 23° C. @ 50% RH for 40 hrs | 1064.7 | 43.14 | 11.18 |
| 18 | Z | 23° C. @ 50% RH for 40 hrs | 1072.96 | 42.93 | 11.73 |
| 19 | Z | 23° C. @ 50% RH for 40 hrs | 1066.26 | 42.18 | 10.27 |
| 20 | Z | 23° C. @ 50% RH for 40 hrs | 1071.6 | 43.12 | 10.67 | etry (DSC) scan at 20° C./min and a second aliphatic semicrystalline polyketone powder having a monomodal melt peak determined the DSC scan at 20° C./min and the aliphatic semicrystalline polyketone powder having a $D_{90}$ particle size of at most 300 micrometers and D50 particle size of 10 micrometers to 125 micrometers equivalent spherical diameter, wherein the semicrystalline polyketone powder is a copolymer of ethylene, carbon monoxide and at least one other alkene monomer.

2. The composition of claim 1, wherein the semicrystalline polyketone powder is a copolymer of ethylene, carbon monoxide and at least one other alkene monomer that is an olefin.

3. The composition of claim 2, wherein the other alkene monomer is an olefin having 3 to 12 carbons.

4. The composition of claim 2, wherein the ethylene is present in a ratio of ethylene/other alkene of about 2 to 100.

5. The composition of claim 1, wherein the first aliphatic semicrystalline polyketone powder has a recrystallization peak that overlaps a portion of the bimodal melt peak during the initial heating and cooling DSC scan.

6. The composition of claim 5, wherein upon a subsequent DSC scan, the first aliphatic semicrystalline polyketone powder has a monomodal melt peak.

7. The composition of claim 6, wherein the subsequent DSC scan has a recrystallization peak that overlaps a portion of the monomodal melt peak.

8. The composition of claim 1, wherein the polyketone powder has a detectable amount of a group 8-10 transition metal catalyst.

9. The composition of claim 1, wherein the melt peak has a melt enthalpy of at least 5 joules/gram of polyketone powder.

10. A composition comprised of an aliphatic semicrystalline polyketone powder having a melt peak and a recrystallization peak as determined by differential scanning calorimetry (DSC) scanned at a 20° C./min heating and cooling rate and a $D_{90}$ particle size of at most 300 micrometers and D50 particle size of 10 micrometers to 125 micrometers equivalent spherical diameter, wherein the melt peak is monomodal and the melt peak and recrystallization peak fail to overlap, wherein the semicrystalline polyketone powder is a copolymer of ethylene, carbon monoxide and at least one other alkene monomer.

11. The composition of claim 10, wherein the melt peak has a melt peak onset temperature and the recrystallization peak has an onset recrystallization temperature that are at least separated by 10° C.

12. The composition of claim 10, wherein the semicrystalline polyketone powder is a copolymer of ethylene, carbon monoxide and at least one other alkene monomer that is an olefin.

13. The composition of claim 12, wherein the other alkene monomer is an olefin having 3 to 12 carbons.

14. The composition of claim 12, wherein the ethylene is present in a ratio of ethylene to the other alkene in a ratio of about 2 to 100 by weight.

15. A method for forming an aliphatic polyketone powder useful for making an additive manufactured article comprising:
  (i) reacting carbon monoxide, alkene monomer in the presence of a group 8 through 10 transition metal catalyst to form a raw polyketone powder,
  (ii) recovering the raw polyketone powder, and
  (iii) separating the raw polyketone powder to form the polyketone powder having a $D_{90}$ particle size of at most 300 micrometers and $D_{50}$ particle size of 10 micrometer to 125 micrometers equivalent spherical diameter and an oversized polyketone powder, wherein the aliphatic polyketone powder is a copolymer of ethylene, carbon monoxide and at least one other alkene monomer and has a bimodal melt peak determined by an initial differential scanning calorimetry (DSC) scan at 20° C./min, wherein the polyketone powder, raw polyketone powder or oversized polyketone powder is subjected to conditions further crystallizing said polyketone powder.

16. The method of claim 15, wherein the further crystallizing is comprised of heat treating any one of the said polyketone powders to a temperature with 50° C. below its peak melt temperature as determined by DSC for a time to increase the crystallinity forming an increased crystallinity polyketone.

17. The method of claim 16, wherein the increased crystallinity polyketone has a melt peak onset temperature and a recrystallization onset temperature that are at least separated by 10° C.

* * * * *